United States Patent [19]

Amedei et al.

[11] Patent Number: 5,142,927
[45] Date of Patent: Sep. 1, 1992

[54] DEVICE FOR CONTROLLING A GEAR BOX OF A VEHICLE, PARTICULARLY AN AGRICULTURAL TRACTOR

[75] Inventors: Giuseppe Amedei, Modena; Angelo Rondelli, Cento, both of Italy

[73] Assignee: Fiatgeotech-Tecnologie per la Terra S.p.A., Modena, Italy

[21] Appl. No.: 613,067

[22] Filed: Nov. 15, 1990

[30] Foreign Application Priority Data

Nov. 23, 1989 [IT] Italy ........................... 4953[U]

[51] Int. Cl.⁵ ............................................. B60K 20/10
[52] U.S. Cl. .................................. 74/335; 74/473 R; 91/368; 91/466
[58] Field of Search ............. 74/335, 473 R, 473 SW, 74/471 R; 91/368, 383, 462, 464, 466

[56] References Cited

U.S. PATENT DOCUMENTS

| | | | |
|---|---|---|---|
| 3,253,613 | 5/1966 | Richolt | 91/466 |
| 3,422,939 | 1/1969 | Henry-Biabaud | 74/335 |
| 3,913,449 | 10/1975 | Koch et al. | 91/368 |
| 4,149,428 | 4/1979 | Mueller | 74/335 X |
| 4,191,202 | 3/1980 | Brent | 91/466 X |
| 4,445,393 | 5/1984 | Braun | 74/473 R X |
| 4,748,863 | 6/1988 | McNinch, Jr. | 74/335 |
| 5,012,725 | 5/1991 | Leary | 74/335 X |

FOREIGN PATENT DOCUMENTS

| | | |
|---|---|---|
| 0125493 | 11/1984 | European Pat. Off. |
| 2617923 | 11/1976 | Fed. Rep. of Germany |
| 3022878 | 1/1982 | Fed. Rep. of Germany |
| 1267233 | 3/1972 | United Kingdom |

*Primary Examiner*—Dirk Wright
*Attorney, Agent, or Firm*—Shlesinger, Arkwright & Garvey

[57] ABSTRACT

The device comprises a lever movable by the operator between at least two working positions and a neutral position to achieve, by means of an hydraulic actuator of double acting follower type, of the gear ratios in one stage of the gear box. The actuator comprises a piston slidable between two working positions and one neutral position to actuate engagement means and defining two chambers; and a shaft connected to the lever by means of a motion transfer unit and shaped as an hydraulic distributor in such a way that in the neutral position of the lever the chambers are connected to a discharge opening so as to determine the neutral position of the piston, and in a manner and in an operative position the stroke of the shaft causes communication of one chamber with the opening and of the other with an inlet opening for a fluid under pressure such that the pressure will translate the piston in the same direction and with the same stroke as the shaft. (FIG. 4).

2 Claims, 3 Drawing Sheets

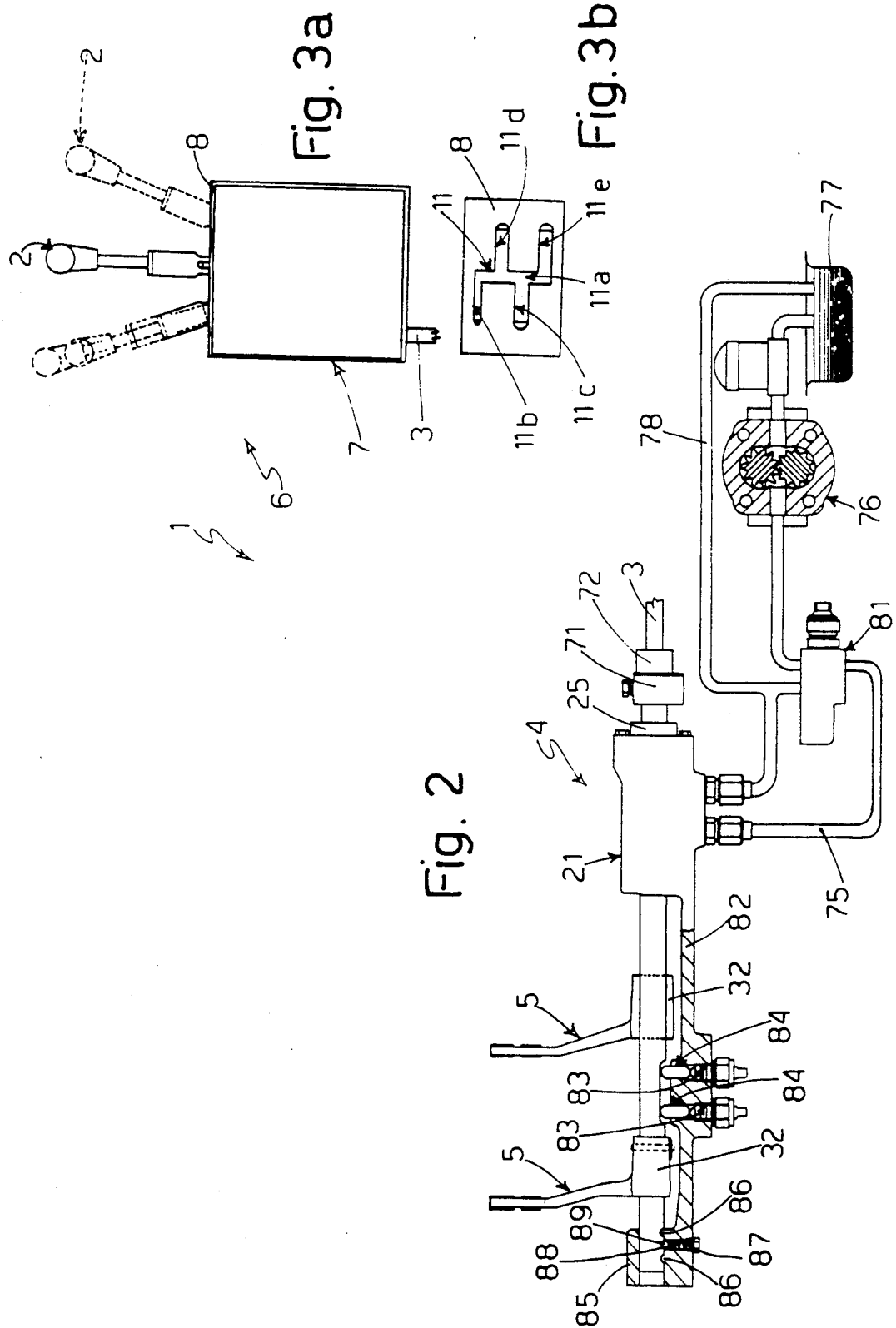

5,142,927

DEVICE FOR CONTROLLING A GEAR BOX OF A VEHICLE, PARTICULARLY AN AGRICULTURAL TRACTOR

BACKGROUND OF THE INVENTION

The present invention relates to a device for controlling a gear box for a vehicle, particularly an agricultural tractor.

As is known, for actuating the engagement of the gears in agricultural tractors three-position fluid controlled actuators (hydraulic or pneumatic) are frequently used.

The said actuators include two pistons slidable sealingly within the interior of a cylinder in which they substantially define two chambers isolated from one another; one is normally provided with an active rod fixed to the mechanical member to be controlled, and the other is adapted to translate within the interior of the cylinder and to cooperate with the first substantially to vary its end-of-stroke position; the three positions are consequently obtained by supplying the said chambers selectively or in combination.

Devices provided with actuators as just described have very many disadvantages.

In particular such devices do not give an exact sensation of the movement of the controlled member so that there is no immediate knowledge that the gear change operation has actually taken place.

SUMMARY OF THE INVENTION

The object of the present invention is that of providing a device for controlling a gear box of a vehicle, particularly an agricultural tractor, which will be free from the above-mentioned disadvantage associated with actuators of the known type described above.

According to the present invention there is provided a device for controlling a vehicle gear box, particularly for an agricultural tractor, of the type comprising a manual lever movable by the operator between at least two working positions and one neutral position to achieve, in the working positions, engagement of the gears of one stage of the said gearbox and, in the neutral position, disengagement of these gears, a motion transfer unit associated with the two operating positions of the said lever by which traction and compression thereof is achieved, and an hydraulic actuator operable to select from three predetermined positions, two operative and one neutral, the position of means for engaging the said gears, characterized by the fact that the said actuator is of the double acting follower type and comprises:

a body within the interior of which a cylindrical cavity is formed;

a piston slidable axially within the said cavity between three positions, two working end positions and a central neutral position;

two chambers defined within the said cavity by the axial ends of the said piston;

a first rod which extends from the said piston and which is adapted to actuate the said engagement means;

a shaft mechanically connected to the said motion transfer unit to follow the translation of this;

an axial hole formed in the said piston and along which the said shaft is adapted to translate; a portion of the said shaft being shaped as an hydraulic distributor in such a way that in the neutral position of the said lever this assumes within the said hole a corresponding neutral position and the said chambers being connected to a discharge opening formed in the said body so as to determine the neutral position of the said piston, in such a way that each operative position assumed by the lever corresponds to a translation towards a working position of the said portion such as to put one of the said chambers into communication with the said discharge opening and the other into communication with a pressure fluid inlet opening such as to give rise to a force which translates the said piston in the same direction and with the same stroke as the said portion.

BRIEF DESCRIPTION OF THE DRAWINGS

For a better understanding of the present invention a preferred embodiment is now described purely by way of non-limitative example, with reference to the attached drawings, in which:

FIG. 2 is a partially sectioned side view of the device of FIG. 1;

FIGS. 3a and 3b are views which illustrate the positioning possibilities of a manual lever for actuating the device of FIG. 1.

DETAILED DESCRIPTION OF THE INVENTION

Figure 1:
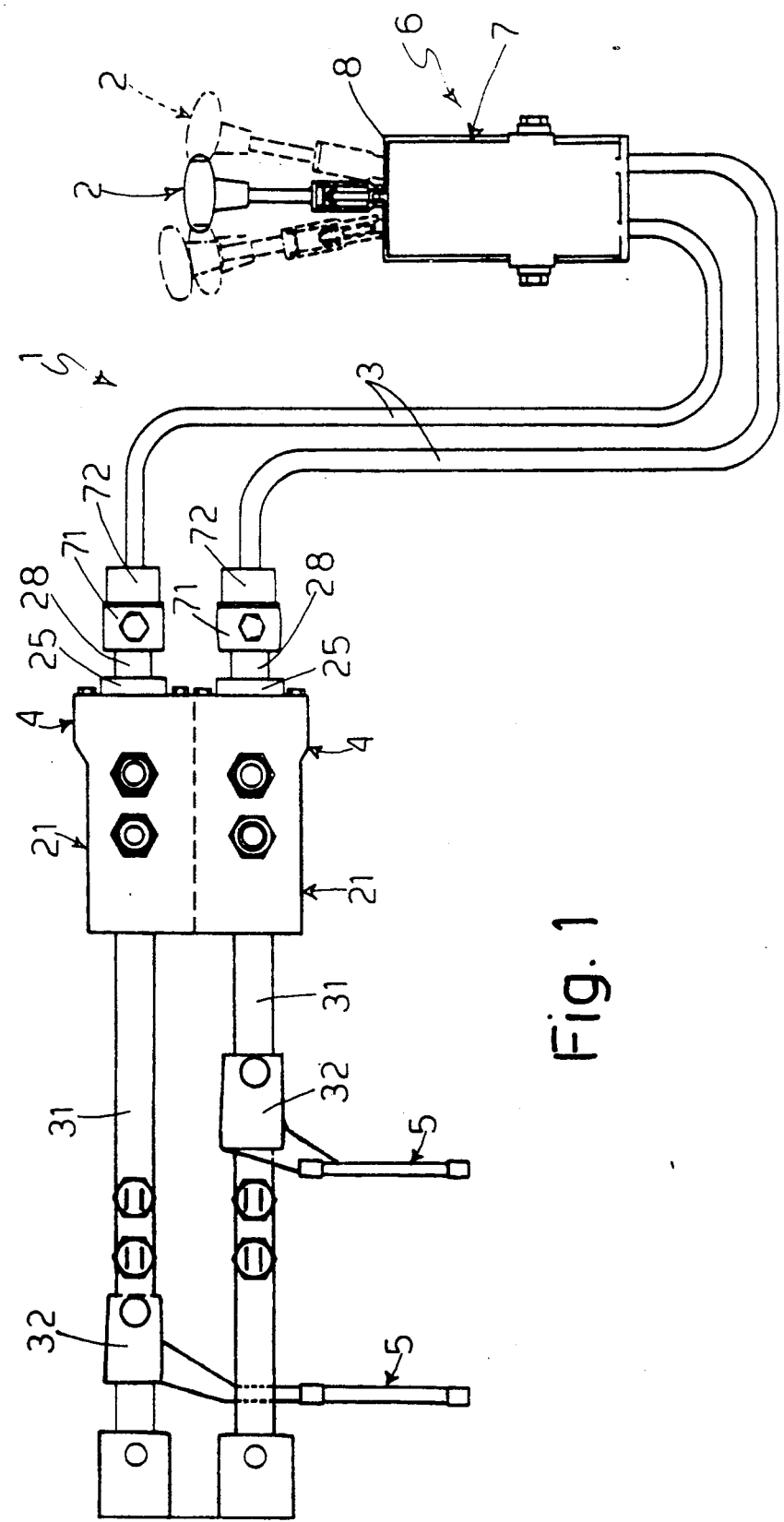
FIG. 1 is a partial plan view of a device formed according to the principles of the present invention.

As illustrated in FIGS. 1 and 2, the reference numeral 1 generally indicates a device for controlling a gear box of an agricultural tractor. In the embodiment illustrated the device 1 controls the range selecting stage of the said gear box and in particular the low, mid and high ranges. Also associated with the control for the three cited ranges in this case is a fourth control for selecting between the reverse command and the parking command if the gear box is of the type known to those in the art as a "power-shift" gear box. The device 1 comprises:

a manual lever 2 movable by the operator between four working positions and a neutral position to achieve, in the working positions, the engagement of a range from among the three possible available ranges, or engagement of the reverse gear or parking control;

a respective flexible motion transfer unit 3 associated with two working positions of the lever 2; and an hydraulic actuator 4 for each motion transfer unit 3 adapted to select from three predetermined positions, two operating and one neutral, the position of a lever 5 which in turn acts on engagement means of known type not illustrated.

The flexible draw rods 3 are of known type such as, for example, those produced by the firm FLEXBALL ITALIANA SpA and essentially comprise a central movable strip which transmits the movement and which carries the necessary attachments at its ends, two half round profiles, a plurality of balls between the two profiles and the central strip, two ball spacer bands and a flexible metal tube within the interior of which the said elements are installed.

With reference to FIGS. 1, 3a and 3b, there is now given an outline indication of the manner of operation of the lever 2 in that, both this manner of operation and the construction of the unit of which the lever 2 forms part are widely known and found in the applicant's tractor product. The lever 2 is fitted in a unit 6 having a casing 7 along an upper wall 8 of which is formed a track or gate 11 along which the lever 2 can be positioned. The gate has a central section 11a corresponding to the neutral position of the lever 2, two sections 11b and 11c formed to the left of the central section 11a as seen in FIG. 3b, the section 11b relating to the position of engagement of the reverse gear or the parking control and the section 11c relating to the position of engagement of a range, for example the high range, and two sections 11d and 11e formed to the right of the central section 11a relating to engagement of the low and middle ranges.

The unit 6 includes within its interior known means which on the basis of the position assumed by the lever 2 determine the displacement in one sense or the other of the motion transfer unit 3 thus effecting the above-described engagements.

Figure 4:
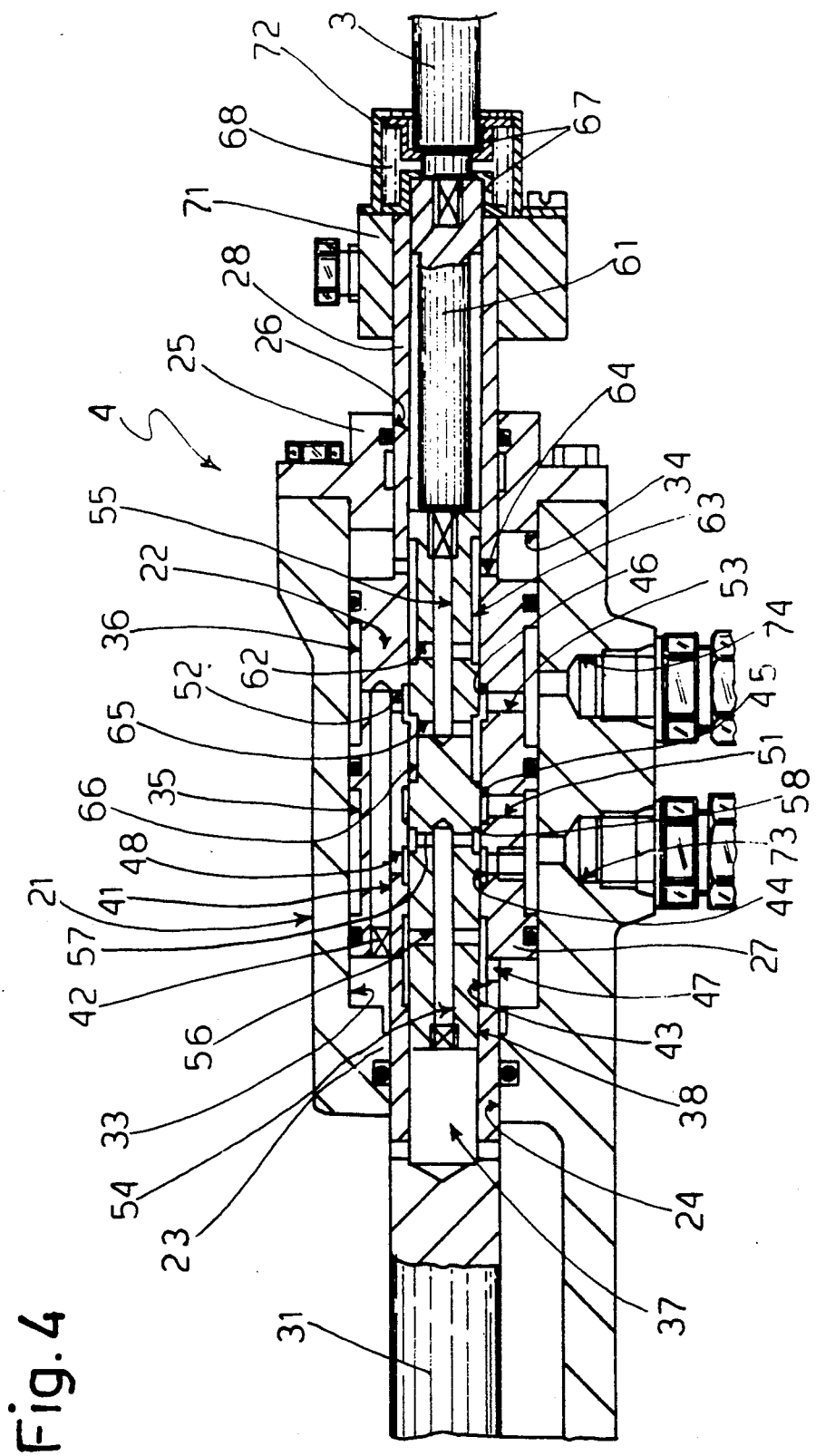
FIG. 4 is a transverse section through an hydraulic actuator of the device of FIG. 1.

With reference to FIG. 4 each actuator 4 comprises a fixed body 21 within which is formed a cylindrical cavity 22 defined between a base wall 23 having a central through hole 24 and a closure plate 25 also having a central through hole 26. The actuator 4 comprises a first piston 27 housed within the cavity 22 and translatable between three predetermined positions along the longitudinal axis of this latter. The outer diameter of the piston 27 is substantially equal to the diameter of the cavity 22 and therefore greater than the diameters of the holes 24 and 26. Coaxially from the axial ends of the piston 27 extend respective rods 28 and 31, the rod 28 of which extends out from the body 21 through the hole 26 and the rod 31 of which extends out from the body 21 through the hole 24. On the rod 31 is fitted one end 32 of a lever 5 a second end of which is coupled to engagement and synchronization means. Within the cavity 22 are defined two annular sealed chambers 33 and 34, of which the chamber 33 is defined between a first axial end of the piston 27 and the wall 23, and the chamber 34 is defined between the second axial end of the piston 27 and plate 25.

On the outer lateral surface of the piston 27 are formed two axially spaced recesses which define, with the cylindrical surface of the cavity 22, two annular sealed chambers 35 and 36, of which the chamber 35 is close to the chamber 33 and the chamber 36 is close to the chamber 34. Through the whole of the rod 28 and the piston 27 and a portion of the rod 31 close to the piston 27 there is formed an axial hole 37 along which a cylindrical shaft 38 is axially slidable, which shaft assumes the function of an hydraulic distributor. Parallel to the hole 37 in the piston 27 is formed a blind hole 41 which extends from the axial end of the piston 27 which delimits the chamber 33. At this axial end of the piston 27 the hole 41 is closed and sealed by a plug 42. Along the wall of the hole 37 the recesses form four annular chambers 43, 44, 45 and 46 between this wall and the outer lateral surface of the shaft 38. The chamber 43 is put in communication with the chamber 33 by radial holes 47 formed in the rod 31. The chamber 44 is put in communication with the hole 41 by a radial hole 48 formed in the piston 27. Along from the chamber 44 there is defined the chamber 45 which is in communication with the chamber 35 through a radial hole 51 formed in the piston 27. Next after the chamber 45 there is defined the chamber 46 which on one side is in communication with the hole 41 by means of a radial hole 52 formed in the piston 27 and on the opposite side is in communication with the chamber 36 through a further radial hole 53 formed in the piston 27.

With reference to FIG. 4, along the longitudinal axis of the shaft 38 and in correspondence with the two axial ends of this there is formed a respective blind axial hole 54 and 55. The hole 54 is closed and sealed by a plug and is formed in that portion of the shaft 38 close to the rod 31. The hole 54 is in communication with the chamber 43 by means of several radial holes 56, and by means of further radial holes 57 is in communication with an annular chamber 58 defined on the outer lateral surface of the shaft 38 by a recess. The chamber 58 is located between the chambers 44 and 45 and in the neutral position of the actuator 4 illustrated in FIG. 4 the chamber 58 is in communication with the chamber 44. The hole 55 has a threaded section engaged by a threaded end portion of a second shaft 61 which extends along the hole 37 outside the rod 28 where it is mechanically connected to the motion transfer unit 3. The hole 55 is in communication via the radial hole 62 with an annular chamber 63 defined on the outer lateral surface of the shaft 38 by the provision of a recess. The chamber 63 is in communication with the chamber 34 by means of the radial hole 64 formed in the rod 28. The hole 55 is in communication with an annular chamber 66, defined on the outer lateral surface of the rod 38 by a recess, via the radial holes 65. The chamber 66 is located between the chambers 45 and 46 and in the neutral position of the actuator 4 illustrated in FIG. 4 the chamber 66 is in communication with the chamber 46. Between a flange formed at the axial end of the shaft 61 and a shoulder formed at the corresponding end of the motion transfer unit 3 there are coaxially installed two caps 67 between which a pre-loaded spring 68 is fitted. One of the caps 67 has a projecting flange which contacts the axial end of the rod 28 and a sleeve 71 locked to this latter. A cup 72 is fixed by means of screws to the sleeves 71 and houses the caps 67 within it in such a way as to prevent these from escaping from the cup 72 itself.

With reference to FIGS. 2 and 4 an inlet opening 73 is formed in the body 21 of each actuator 4 and is adapted to put the chamber 35 into hydraulic communication with a supply duct 75 which extends from the delivery outlet of a pump 76 adapted to pump a fluid from a reservoir 77. In the body 21 there is further formed an outlet opening 74 which puts the chamber 36 into communication with a duct 78 for the discharge of fluid back to the reservoir 77. A pressure relief valve 81 is installed in the duct 75.

With reference to FIGS. 1 and 2, the bodies 21 of the two actuators 4 are made in one piece and from these extend, parallel to the rod 31, a plate 82 in which, for each rod 31, there is first of all formed a respective seat 83 for two sensors 84 for detecting the axial position of the rod 31 and subsequently a sleeve 85 engaged by the free axial end of the rod 31. At this end of the rod 31 there are formed in succession on its surface three hemispherical notches 86 corresponding to the three axial positions which the rod 31 can assume. In the sleeve 85 there is formed a radial hole 87 in which acts a spring 88 which presses a ball 89 towards the rod 31. Engagement of this in a notch 86 impedes accidental translation of the rod 31.

In FIG. 4 the shaft 38 is illustrated in the central or neutral position corresponding to the position of the lever 2 along the arm 11a of the gate. This central position of the shaft 38 corresponds to a central position of the piston 27 and therefore of the rod 31 in turn corresponding to the neutral position and therefore disengagement of the coupling sleeve carried by the lever 5.

The centered position of the shaft 38, with respect to the piston 27, is maintained by the spring 68 in such a way that the chambers 33 and 34 are connected to the opening 74.

In fact the chamber 34 is in communication with the opening 74 through the holes 64, the chamber 63, the hole 62, the hole 55, the holes 65, the chamber 66, the chamber 46, the hole 53, and the chamber 36. The chamber 33 is in communication with the chamber 46 and therefore with the opening 74 through the holes 47, the chamber 43, the holes 56, the hole 54, the holes 57, the chamber 58, the chamber 44, the hole 48, the hole 41, and the hole 52.

We now examine for example the operation of the actuator 4 corresponding to the selection of engagement of two ranges and therefore the positioning of the lever 2 in the arm 11d or 11e of the gate. First of all it is to be noted that the positioning of the lever 2 in these arms of the gate causes the longitudinal traction or compression of the motion transfer unit 3 associated with this pair of gate arms, and therefore translation in one direction or the other of the shaft 38. With reference to FIG. 4, if the shaft 38 is translated, against the action of the spring 68, towards the right as seen in FIG. 4, whilst the chamber 66, because of its longitudinal extent, remains in communication with the chamber 46 thus determining communication between the chamber 34 and the discharge opening 74, the chamber 58 is no longer in communication with the chamber 44 but in communication with the delivery outlet 73 through the chamber 45 and the hole 51. From the chamber 58 through the holes 57, the hole 54, the holes 56, the chamber 43, and the holes 47 the fluid under pressure is introduced into the chamber 33 thus causing translation towards the right of the piston 27 equal to that performed by the shaft 38. As will be evident, the piston 27 will draw the lever 5 by means of the rod 31 which causes engagement of one range of gears.

If the shaft 38 is translated towards the left from the neutral position, still against the action of the spring 68, communication between the chambers 46 and 66 and communication between the chambers 45 and 58 is closed so that in a manner similar to what has just been described the chamber 33 is in communication with the discharge opening 75 with the same path examined during the description of the neutral position of the shaft 38. Whilst the chamber 34 is connected to the delivery opening 73 through the holes 64, the chamber 63, the holes 62, the hole 55, the holes 65, the chamber 66, the chamber 45, the hole 51, and the chamber 35. The introduction of fluid under pressure into the chamber 34 causes an axial thrust of the fluid on the piston 27 which will perform a translation towards the left equal to that performed by the shaft 38. An equal translation of the rod 31 will therefore take place which will cause, by means of the lever 5, engagement of a range.

The actuator 4 is therefore shaped in such a way that in whatever position is assumed by the shaft 38 the piston 27 automatically stops in the same position. In summary, the piston 27 repeats the movement of the shaft 38 in that a force is applied to the piston 27 proportional to the thrust area defined thereon and the pressure of the fluid. By suitably calculating these two parameters it is possible to allow the piston 27 to follow the translation of the shaft 38 with an equal movement.

From what has been described above, the advantages achieved by the present invention are evident.

In particular, with a reduced force applied to the lever 2 for movement of this along the track 11 by means of the actuator unit 4 the necessary force to achieve engagement or disengagement of the gears or the ranges is achieved. Each actuator 4 has a control shaft 38 fixedly connected to the corresponding motion transfer unit 3 and the axial translation of which determines an equal translation of the piston 27 and therefore of the engagement and disengagement unit. All this implies that the systems for detecting the engagement and disengagement can be installed at will on one of the said members in motion with all the advantages which derive therefrom, such as, for example, a simplified assembly and a smaller overall bulk. It is moreover to be emphasized that a very important characteristic for the operator and which is encountered during the engagement and disengagement movements, lies in giving the operator an exact sensation of the movement of the piston 2 and therefore of the execution of the controlled maneuver. In fact, if during translation of the shaft 38 the piston 27 should not follow the position of this, the small stroke of the shaft 38 determined by the predetermined distance between the plates 67 is used up, the shaft 38 via the second shaft 61 would then strike against the rod 28 giving the operator the certainty that the maneuver being commanded has not been executed. Finally, it is to be noted that as soon as the lever 2 in the track 11a of the gate is released by the operator the shaft 38 and therefore the whole actuator returns automatically into the neutral position by means of the spring 68.

Finally, it is clear that the device 1 described and illustrated here can have modifications and variations introduced thereto without by this departing from the protective ambit of the present invention.

We claim:

1. A device for controlling a vehicle gear box, particularly for an agricultural tractor, of the type comprising a manual level (2) movable by an operator between at least two working positions and one neutral position to achieve, in the working positions, the engagement of the gears of one stage of the gear box and, in a neutral position, the disengagement of these gears, a motion transfer unit (3) operably associated with the lever (2) such that movement of the lever into the two working positions causes retraction or extension of the motion transfer unit, and a hydraulic actuator (4) operable to select, from three predetermined positions, two operative and one neutral, and means (5) for engaging the gears, characterized by the fact that said actuator (4) is of a double acting follower type and comprises:

a body (21) having a cylindrical cavity (22);

a piston (27) axially slideable within said cavity (22) between three positions, two working end positions and a central neutral position;

two chambers (33 and 34) defined within said cavity (22) by axial ends of said piston (27);

a first rod (31) which extends from said piston (27) and which is adapted to actuate the engagement means (5);

a shaft (38, 61) operably connected to the motion transfer unit (3) such that said shaft is moved upon movement of the motion transfer unit;

an axial hole (37) formed in said piston (27) and in which said shaft (38, 61) is adapted to move; and, a portion (38) of said shaft being shaped as a hydraulic distributor in such a way that in the neutral position of the lever (2) said portion assumes a position in said hole (37) corresponding to neutral in which said chambers (33 and 34) are connected to a discharge opening (74) formed in said body (21) so as to determine the neutral position of said piston (27), in such a way that to each operative position assumed by the lever (2) there corresponds a translation towards a working position of said portion (38) such as to put one of said chambers into communications with said discharge opening (74) and of the other with an inlet opening (73) for a fluid under pressure, such as to cause a force which translates said piston (27) in the same direction and the same distance as said portion (38).

2. A device according to claim 1, further including:
(a) resilient means (68) for opposing the translation of said shaft (38) from its neutral position to its working positions, said resilient means (68) automatically causes said shaft (38) to assume its neutral position when the operator releases said lever (2).

* * * * *